May 30, 1933. P. E. MATTHEWS 1,912,004
CLUTCH VIBRATION DAMPER
Filed Aug. 15, 1930
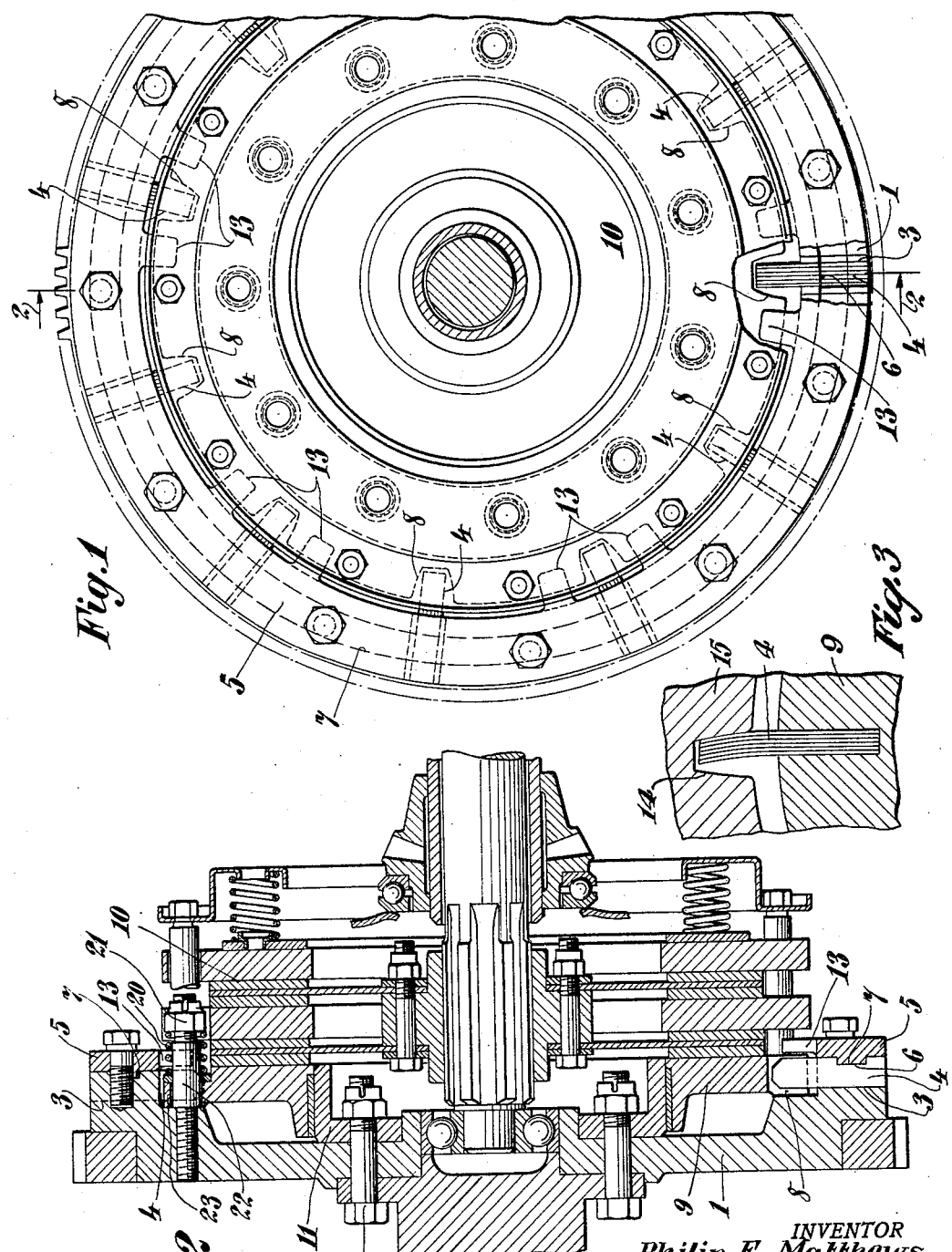
INVENTOR
Philip E. Matthews,
BY
Redding, Greeley, O'Shea & Campbell
HIS ATTORNEYS Patented May 30, 1933

1,912,004

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

CLUTCH VIBRATION DAMPER

Application filed August 15, 1930. Serial No. 475,443.

The present invention relates to clutches and embodies, more specifically, an improved form of clutch vibration damper by means of which the periodic vibrations created in the crank shaft of an internal combustion engine are prevented from being transmitted to the gear box and drive line of the chassis.

Existing clutch designs have incorprated in the elements thereof torsional vibration dampers embodying a series of helical coil springs which are mounted in the driven clutch disc in such manner that the turning effort of the engine is transmitted to the driven members through such springs, thus damping any torsional vibrations which are set up in the crank shaft. The disadvantage of a design of this character is that the damper springs which, for constructional reasons, are mounted adjacent the drive shaft center, are subjected to high stresses resulting in frequent breakage. This condition is particularly pronounced when a damper of this character is used on a heavier vehicle of the commercial type.

In making a very careful survey and study of these mechanisms, it has been found that leaf springs present certain advantages not found in coil springs, in as much as the unit working stresses for each spring can be held down to a reasonable limit, thus minimizing the danger of breakage due to overstress or fatigue.

An object of the invention, accordingly, is to provide an improved clutch damping mechanism by means of which the unit stress impressed upon the damping springs is reduced to a predetermined desired minimum.

A further object of the invention is to provide a clutch construction of the above character in which is embodied a plurality of leaf springs which are seated between and connect certain relatively rotatable members in such manner that their tendency to break or fail under fatigue is reduced to an absolute minimum.

A further object of the invention is to provide a construction of the above character, wherein a seating surface is provided for a leaf spring which is employed as a damper in a clutch construction, such seating surface conforming to the deflection curve of the spring, thus providing the maximum wearing surface available with uniform unit pressure when in the loaded position of the spring.

A further object of the invention is to provide a construction of the above character wherein the shearing action of overloads on the damper springs is reduced to a minimum.

Further objects of the invention, not specifically enumerated above, will be apparent as the invention is described in greater detail in connection with the accompanying drawing, wherein:

Figure 1 is a view in end elevation showing a clutch constructed in accordance with the present invention and broken away to illustrate the details thereof more fully.

Figure 2 is a view in section, taken on line 2—2 of Figure 1, and looking in the direction of the arrows.

Figure 3 is a detail view in section, illustrating the position assumed by the springs when under stress.

Referring to the above drawing, particularly Figures 1 and 2, the conventional flywheel is shown at 1 as mounted upon a crank shaft 2. On its periphery, the flywheel is provided with a series of radial slots 3 within which laminated leaf springs 4 are secured. These springs are held in place by cover plates 5 and are formed with notches 6 which engage an annular rib 7, formed on the cover plates, to prevent the springs from shifting. The active or inner ends of the leaf springs engage slots 8 which are formed in the floating clutch mounting disc 9. The sides of the slots are formed as parabolic surfaces to conform to the outline of the deflection curve of the springs.

The clutch assembly including the relatively rotatable disc and frictional elements are indicated at 10 and form no part of the present invention, in as much as any form of clutch assembly may be used on the floating clutch mounting disc 9. An annular hub 11 is secured to the flywheel by means of bolts 12 and affords a cylindrical bearing surface which centers the floating clutch mounting disc 9 with respect to the clutch elements. Lips 13 are formed on the cover plates 5 to limit the axial movement of the floating disc 9 with respect to the flywheel and crank shaft.

In order that the clutch damper may function properly, it is desirable to afford an additional friction means which will dampen out the vibrations of lesser periods. To accomplish this, the floating disc is pressed against the flywheel by means of a series of helical coil springs 20, thus creating a friction at the area of contact between the flywheel and floating disc. The amount of this friction may be regulated by an adjustment nut 21. Besides serving as a mounting means for the coil springs 20, the studs 22 serve as stops for the oscillating movement of the floating disc with respect to the flywheel. This is accomplished by providing elongated slots 23 in the floating disc.

From the foregoing, it will be seen that a clutch construction has been provided, wherein all vibrations are effectively dampened before being transmitted to the gear box and driven elements. The unit stress upon the springs is greatly reduced and the life of the springs prolonged by reason of the formation of the bearing surfaces to conform to the deflection curve of the springs. The shearing stress is greatly reduced by providing rounded corners at the entrance to the recesses 14 and 8 as clearly shown in Figure 3.

While the invention has been described with specific reference to the accompanying drawing, it is not to be limited, save as defined in the appended claim.

I claim as my invention:

A clutch and flywheel construction comprising an inertia member, a hub formed thereon, a floating disc carrier member journaled on the hub, radial leaf springs secured to one of the members, springs secured to the inertia member to position the floating disc, a cover plate for securing the first named springs to the said member, recesses formed in the floating disc with surfaces curved to conform to the deflection curve of the springs, and a retaining member on the cover plate for limiting axial movement of the floating disc.

This specification signed this 12th day of August A. D. 1930.

PHILIP E. MATTHEWS.